United States Patent [19]
Smith

[11] 3,730,984
[45] May 1, 1973

[54] METHOD AND APPARATUS FOR AUTOMATIC VIDEO DISTORTION CORRECTION

[75] Inventor: Clyde Smith, North Salem, N.Y.

[73] Assignee: Columbia Broadcasting System, Inc., New York, N.Y.

[22] Filed: Mar. 31, 1972

[21] Appl. No.: 240,195

[52] U.S. Cl. ................178/6, 178/5.2 R, 178/5.4 TE, 178/DIG. 4, 178/DIG. 13, 325/308

[51] Int. Cl. ..........H04n 5/20, H04n 7/10, H04n 9/02

[58] Field of Search ......................178/5.2 R, 5.4 TE, 178/DIG. 4, DIG. 13; 325/308; 333/18

[56] References Cited

UNITED STATES PATENTS

| | | | |
|---|---|---|---|
| 3,534,155 | 10/1970 | Rhodes | 178/5.4 TE |
| 3,646,254 | 2/1972 | Illetschko | 178/5.4 TE |
| 3,704,419 | 11/1972 | Rheinfelder | 178/DIG. 13 |

*Primary Examiner*—Howard W. Britton
*Attorney*—Martin M. Novack

[57] ABSTRACT

An apparatus that receives input video which includes picture video and test signals that occur periodically between segments of picture video. The test signals contain video distortion errors dependent on at least one varying property of input video. The system automatically generates corrected picture video, the degree of correction depending on errors extracted from the test signals. In a preferred embodiment of the invention, separate storage units are provided to store error signals associated with differential gain and differential phase. Stored error signals, which are updated every video frame, are selectively used in corrective fashion, the instantaneous correction amount depending on the instantaneous luminance level of video picture information.

21 Claims, 7 Drawing Figures

Patented May 1, 1973

3,730,984

6 Sheets-Sheet 1

Patented May 1, 1973 3,730,984

6 Sheets-Sheet 5

METHOD AND APPARATUS FOR AUTOMATIC VIDEO DISTORTION CORRECTION

BACKGROUND OF THE INVENTION

Color television imposes severe requirements on video transmission channels. Color signals are more complex than black and white signals, and channels must be more distortion-free in order to deliver acceptable color pictures to the viewer. This means that TV video channels must be frequently tested and, when possible, adjustments made to compensate for distortions that arise during transmission.

Some years ago, the visual test patterns transmitted during idle periods were deemed inadequate to meet modern requirements. TV broadcasters and networks began to transmit special test signals, called "vertical interval test signals" (VITS), along with normal TV picture signals. The test signals were chosen to be sensitive to the types of distortion which are most disturbing to viewers. They are transmitted while the channel is in actual operation and combine several test waveforms developed by television broadcasters and carriers.

One of the test signals included in VITS is a "modulated stairstep" that is used in detecting differential gain and differential phase distortions in a transmitted signal. The modulated stairstep test signal is inserted on the 19th line of the second field of each television video frame. Typically, it consists of a 10-step signal going from black to white luminance levels with a 3.58 megahertz color subcarrier sine wave superimposed on each step. Differential gain is the variation in the gain of a transmission system as the luminance signal varies between the values for black and for white. In a properly operating system, changes in luminance voltage should produce no change in the amplitude of the sine wave. Differential gain is ordinarily detected by removing the steps with a bandpass filter centered at 3.58 megahertz. This puts 10 bursts of sine wave on the same line and permits comparison of their amplitudes with, for example, a peak detector. Differential phase is the variation in the phase characteristic of a system as the luminance level changes from black to white. The modulation stairstep is generally processed with a synchronous phase detector to check for this type of distortion. Phase shifts of about 1° or more can normally be detected in this manner.

Traditionally, the VITS signals have been used to evaluate the transmission characteristics of a channel, for example, to see if the channel is meeting some predetermined quality standard. Thus, if a network program is transmitted over a telephone line, and the telephone company has contracted to provide distortion below a specified level, the VITS signals give indication as to whether the requirement is being met. When undesirable distortion is found at the receiving end of a transmission channel, certain adjustments can be made at that end to compensate for distortions. However, since the characteristics of a commercial transmission channel do not remain constant, it is necessary, when using this type of correction, to periodically check distortion levels and make appropriate updated corrections. Even this procedure, however, does not account for continuous drifts in the transmission characteristics of a channel.

Accordingly, it is one of the objects of this invention to provide a system that is capable of automatically and continuously correcting video signals that have passed through a distortion-causing channel or path.

SUMMARY OF THE INVENTION

The present invention is directed to an apparatus that receives input video which includes picture video and test signals that occur periodically between segments of picture video. The test signals contain video distortion errors dependent on at least one varying property of the input video. The system automatically generates corrected picture video, the degree of correction depending on errors extracted from the test signals. In accordance with the invention, there is provided means responsive to the input video for categorizing the status of the input video and producing categorization signals indicative of the determined status. Means also responsive to the input video extract distortion errors from the test signals and generate error signals as a function of the distortion errors. Further provided is an error storage means that includes a plurality of storage units which selectively store the error signals under control of the categorization signals. Error reading means selectively read out the contents of the storage units, also under control of the categorization signals. Correction means are provided for modulating the input video in accordance with the output of the reading means to produce corrected picture video. In a preferred embodiment of the invention, separate storage units are provided to store error signals associated with differential phase and differential gain. The stored error signals, which are updated every video frame, are selectively used in a corrective fashion, the instantaneous correction amount depending on the instantaneous luminance level of the video picture information.

Further features and advantages of the invention will become more readily apparent from the following detailed description when taken in conjunction with the accompanying drawings.

DESCRIPTION OF THE PREFERRED EMBODIMENT

Figure 1:
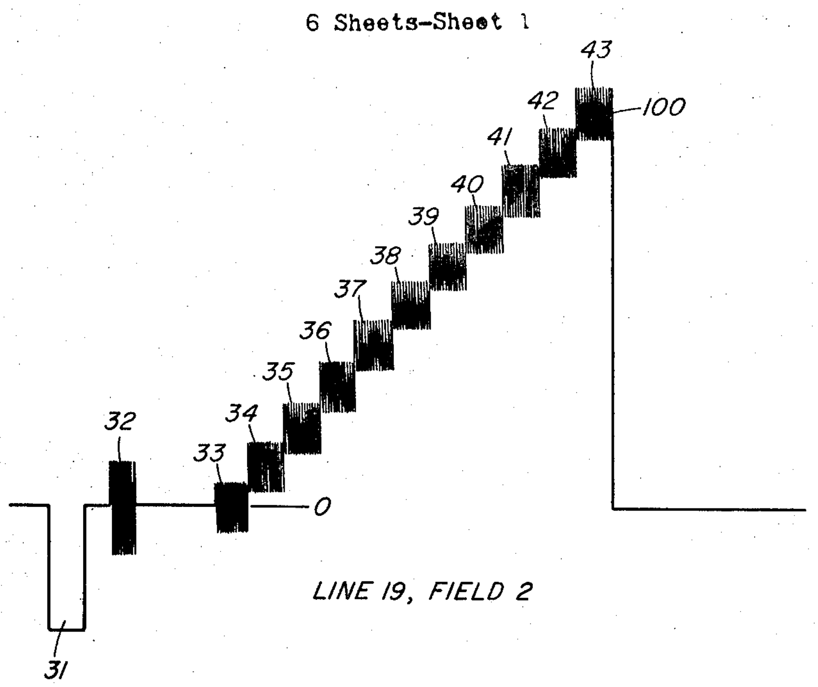
FIG. 1 is a graph of the modulated stairstep portion of the VITS test signal.

Referring to FIG. 1, there is shown a graphical representation of the information contained in the 19th line of the second field of each television video frame of a conventionally transmitted color television video signal. This line contains the modulated stairstep portion of the VITS test signals and is used in detecting differential gain and differential phase distortions in a transmitted signal. The reference numeral 31 represents the horizontal sync pulse which is followed by a reference burst of oscillations 32 that is present only during the transmission of a color program. This burst, and the oscillations superimposed on the subsequent steps, are each generated at 3.58 megahertz, the standard color subcarrier frequency. Steps designated 33 through 43 are centered at various luminance levels that range between 0 and 100 IRE scale units, i.e. representing approximately even gradations between blanking and reference-white.

When line 19 is generated at the broadcast station, the stairsteps are substantially the same height and the oscillations superimposed on each step have substantially the same amplitudes. The amount of differential gain in a particular transmission channel can be measured at the receiving end by removing the steps (which normally have a fundamental of 15 kilohertz) using a high-frequency band pass filter and then comparing the amplitudes of the resultant adjacent bursts of sine wave. Differential phase is the variation in the phase characteristic of the system as the luminance level varies between black and white. This can be detected at the receiving end by processing the filtered steps with a synchronous phase detector that determines phase differences as between the high frequency oscillations on the various steps.

Figure 2:
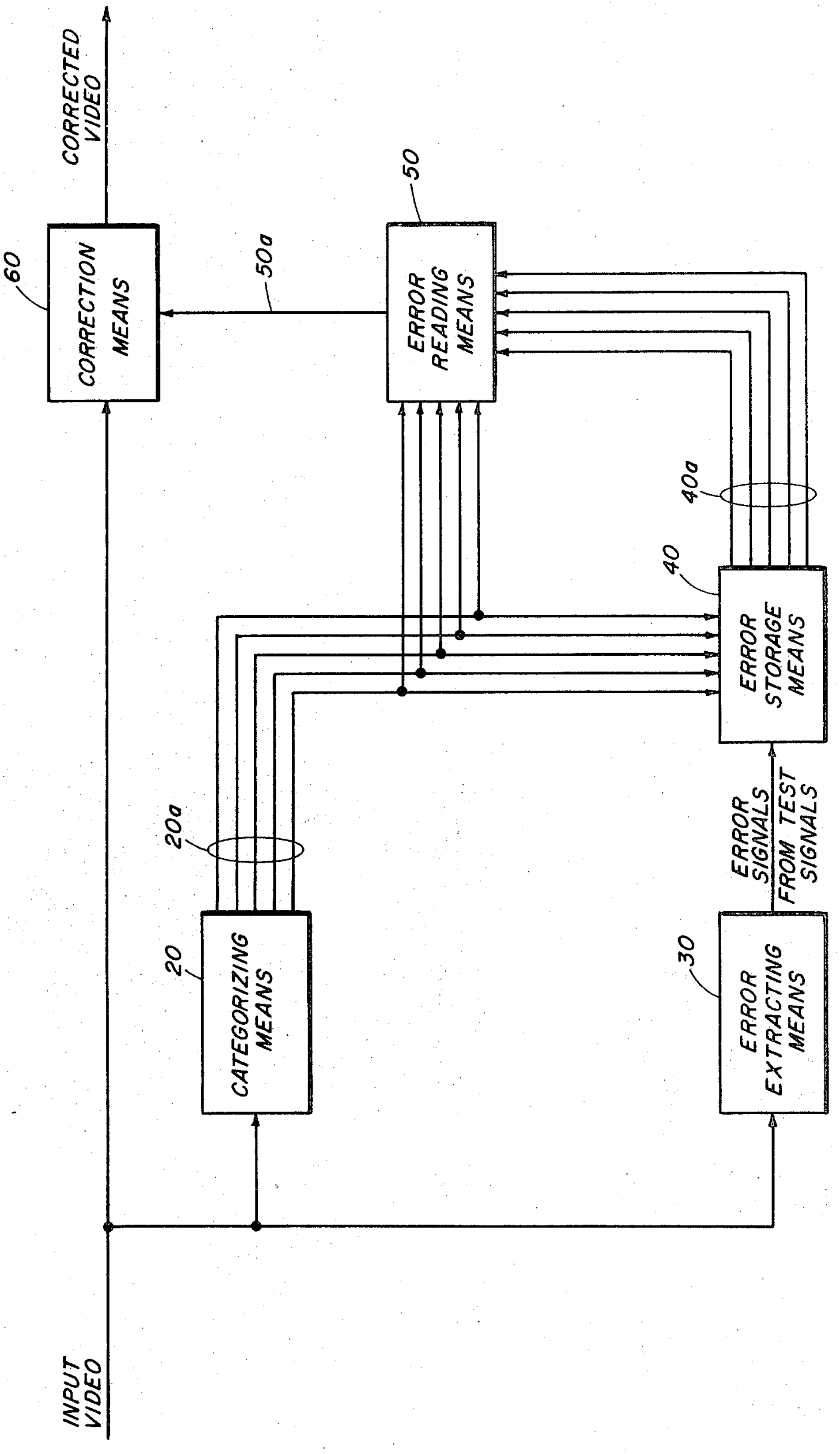
FIG. 2 is a simplified block diagram of a correction system in accordance with the invention.

Referring to FIG. 2, there is shown a simplified block diagram of a correction system in accordance with the invention. Input video received by a categorizing means 20 which detects the instantaneous luminance level of the input video and produces an output on one of five output lines, depending on the level category or classification the input video takes on at a particular moment. The categorizatization signals 20*a* are coupled to both an error storage means 40 and an error reading means 50.

The input video is also coupled to an error extracting means 30 which, in this embodiment, is active only during the presence of the test signal portion of input video. When the test signal is present, the error extracting means 30 derives error signals from the test signals and applies these error signals to the error storage means 40. The means 40 includes a plurality of storage units which selectively store the error signals under control of the categorization signals 20*a*. The number of storage units equals the number of categorization signals 20*a* and each of these signals acts to enable one only of the storage units at a particular time. In this manner, the errors corresponding to different video levels are stored in separate storage units.

During the presence of picture video, the error extracting means is inactive but the categorizing means 20 continues to produce categorization signals 20*a* that depend on the instantaneous value of the luminance level of the picture video. Throughout the picture video portion of a particular television video frame, the error signals which had been stored during the test signal portion of the input video are available for reading on a number of lines designated as 40*a*. An error reading means 50 selectively reads out the values on the lines 40*a* under control of the categorization signals 20*a*. The categorization signals allow selection of the proper error quantity associated with a particular level that the picture video assumes at a particular moment.

The selected error signal, read out on line 50*a*, is coupled to a correction means 60 which also receives the input video. The output of the means 60 is a video signal that has been corrected by amounts that are determined by errors extracted from the test signals associated with the present video frame. When the next group of test signals arrives (during the next video frame), a new set of error values are stored in the storage means 40 and these error values used during the two subsequent video fields to correct picture video. This process continues automatically in a dynamic manner to correct video.

Figure 3:
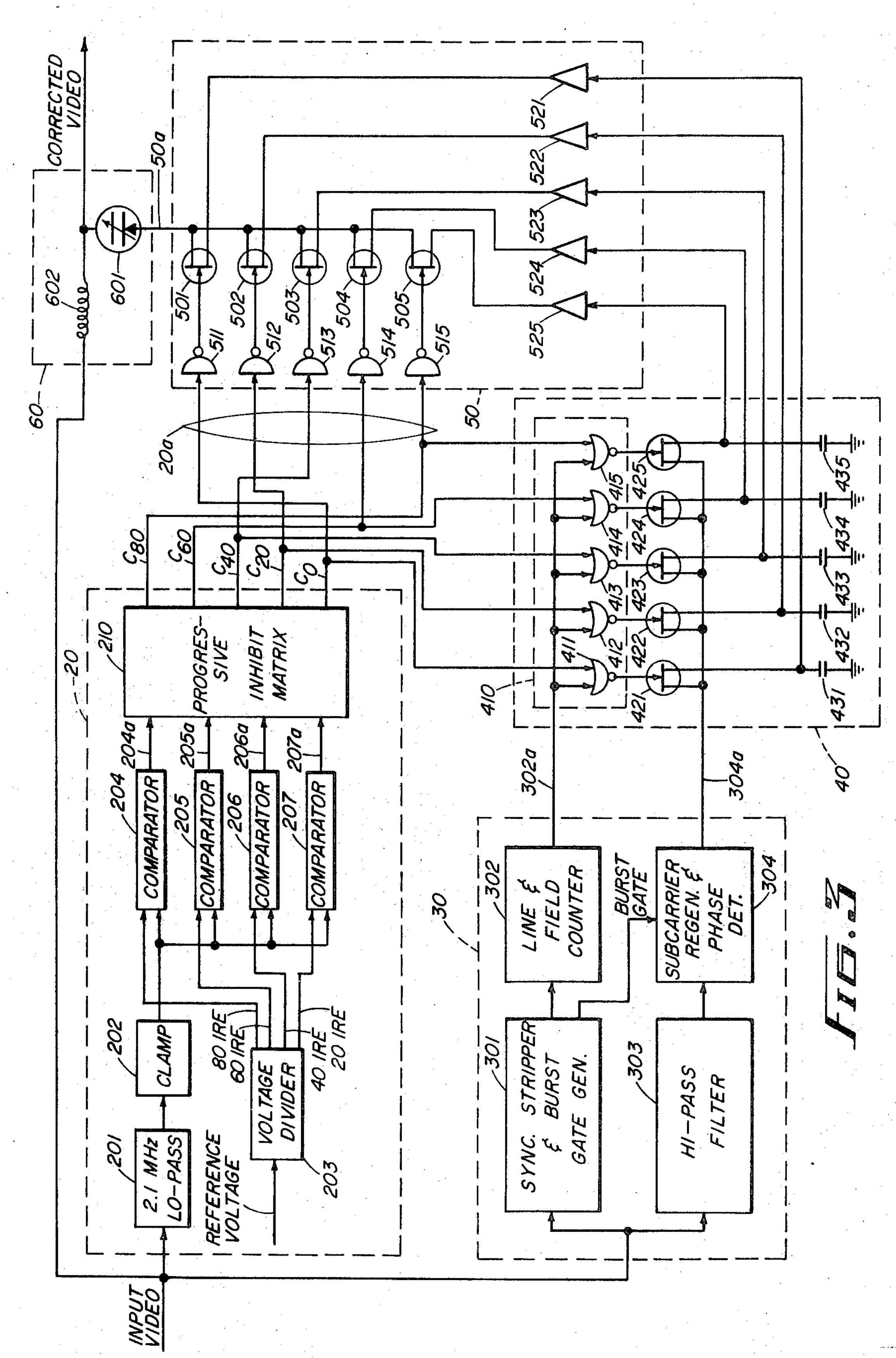
FIG. 3 is a block diagram of an embodiment of the invention that is utilized for the correction of differential phase distortions.

Referring to FIG. 3, there is shown a block diagram of an embodiment of the invention that is utilized for the correction of differential phase distortions. The categorizing means 20 (shown in dashed enclosure) includes a 2.1 megahertz low-pass filter 201 that removes the color subcarrier from the input video. The output of filter 201 is coupled to a conventional clamp circuit 202 which generates a luminance signal that is referenced to an established ground. A voltage divider 203 divides a reference voltage into a plurality of lesser voltages that correspond to certain predetermined IRE scale units. In the present embodiment, the voltage divider 203 is utilized to obtain constant output levels at 80, 60, 40 and 20 IRE scale units. These output signals are respectively coupled to a plurality of voltage comparator circuits designated 204, 205, 206 and 207, each of which receives as its other input the clamped video signal.

The comparators 204 – 207 are operative to produce a "high" digital output signal ("1") only when the received clamped video signal is greater than the reference voltage level input of the particular comparator. The comparator outputs are therefore "progressive" in nature; i.e., if a particular comparator has a "-high" output, all comparators below it must also have a "high" output. The comparator outputs on lines 204*a* – 207*a* are coupled to a progressive inhibit matrix 210 which, in this embodiment, has five outputs on the lines collectively referred to as 20*a*.

Figure 4:
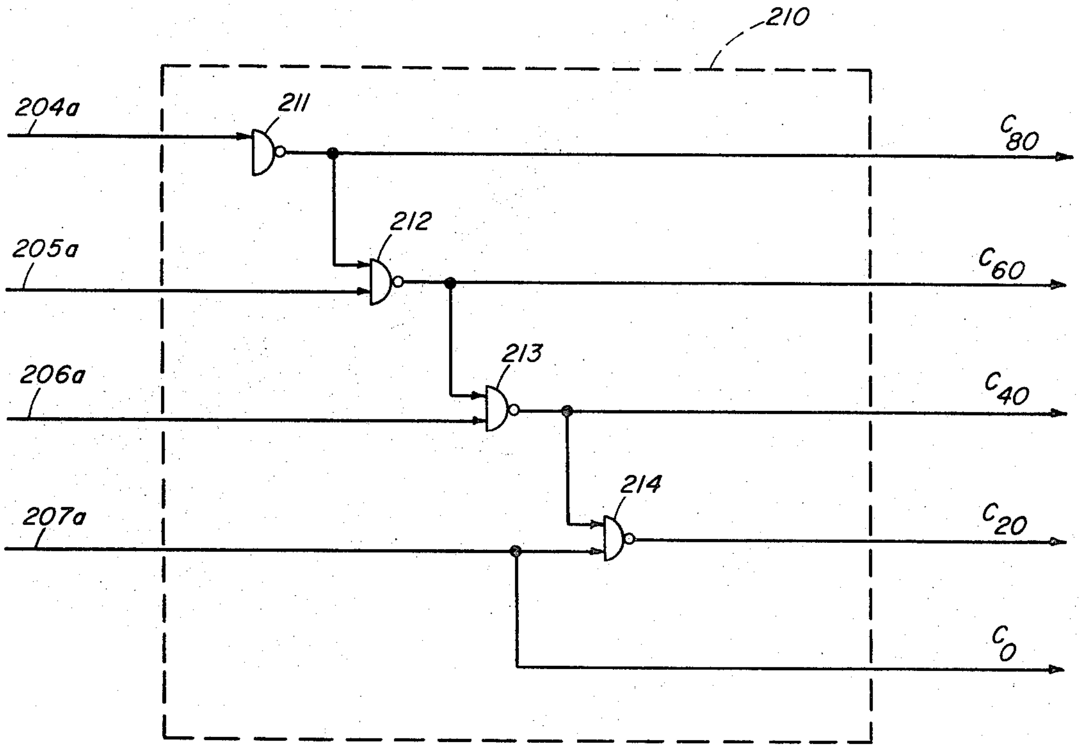
FIG. 4 is a schematic diagram of the progressive inhibit matrix of FIG. 3.

The matrix 210 is shown in further detail in FIG. 4 and is seen to include four NAND gates 211 – 214 which have outputs designated $C_{20}$ through $C_{80}$. The signals 204*a* – 207*a* are received as inputs by the gates 211 – 214, respectively. In addition, the gates 212, 213 and 214 each receive, as a second input, the output of its next higher gate. The input 207*a* is coupled to the output designated $C_0$.

The operation of the matrix 210 is such that only one of its output lines 20*a* is "on" at a time, where a logical "0" signal is considered as "on" for output purposes. For example, if the clamped input video is below 20 IRE scale units, the output of all comparators (FIG. 3) are "0." The "0" signals on the lines 204*a* – 207*a* constrain the outputs of the gate 211 – 214 at "1." Only the output $C_0$ is at a "0" level. This output situation exists for any clamped video input between 0 and 20 IRE scale units. When the clamped input video is between 20 and 40 IRE scale units, the input signal on line 207*a* will be a "1" and the other inputs will be at "0." In this situation, the output of gate 214 ($C_{20}$) will be "0," and the output $C_0$ a "1." As before, the gates 211 – 213 have "1" outputs, so the only output that is "0" is $C_{20}$. When the clamped input video is between 40 and 60 IRE units, the inputs on lines 206a and 207a must both be "1," with the other inputs at "0." In this case, only the gate 213 has all "1" inputs and a resultant "0" output. The matrix operates similarly for inputs between 60 – 80 and 80 – 100 IRE units, producing a "0" only for the outputs $C_{60}$ or $C_{80}$ for these cases, respectively. The digital outputs on the lines 20a thus reflect the instantaneous luminance voltage level of the input video.

Referring again to FIG. 3, the error extracting means 30 is seen to include a conventional sync stripper and burst gate generator 301 which separates vertical and horizontal sync pulses from the input video and forms a burst gate. The sync signals are received by a line and field counter 302 which, using conventional counting circuitry, produces an enable signal on line 302a only during the 19th line of the second field of each video frame. The input video is additionally received by a high-pass filter 303 which passes the color subcarrier portion of the received video to a subcarrier regenerator and phase detector circuit 304. In conventional fashion, the burst gate from sync stripper 301 is utilized to phase-lock a 3.58 megahertz oscillator. The color subcarrier from filter 303 is phase detected as against the phase-locked oscillator signal. The output on line 304a is a voltage level that is proportional to the phase difference between the reference burst and the color subcarrier content of the input video.

As will be realized hereinafter, the signal on line 304a is utilized only during line 19 and, during this line, the phase detector voltage continuously indicates phase errors resulting from differential phase distortion. Referring again momentarily to FIG. 1, it will be recalled that in a properly operating system the oscillations on each of the steps 33 – 34 should be in phase with the burst oscillations 32. When differential phase distortions are present, however, the amount of phase distortion during a particular step will be indicated by the voltage level on line 304a.

The error storage means 40 includes an enable gate 410 that comprises five NOR gates 411 – 415. The NOR gates receive the outputs $C_0 - C_{80}$ as their respective inputs. Each NOR gate receives as a second input the enable signal on line 302a which is generated so as to be a logical "0" during line 19 of the second field of each video frame and a logical "1" during all other video. With this setup, the enable gate 410 can produce a "high" ("1") output only during line 19, and the "1" output will appear only on the line corresponding to the single "0" output from among $C_0 - C_{80}$.

The outputs of the NOR gates 411 – 415 are coupled to the gate electrodes of five field-effect transistors (FETs) designated 421 – 425. The drain electrode of each FET is coupled to line 304a and the source electrodes of the FETs are respectively coupled to five capacitive storage units designated 431 – 435. The FETs 421 – 425 act to control the storage of error voltages on line 304a only during the stairstep test signal and only in the particular storage unit that is utilized to exclusively store errors that relate to a particular video luminance level category. For example, when the stairstep voltage is below 20 IRE scale units, only the field effect transistor 421 is enabled, so that the capacitor 431 exclusively stores error voltages on line 304a that occur while the stairstep luminance component is in this range. For the test signal of FIG. 1, this will normally be during steps 33 and 34 of the signal shown. Similarly, the transistors 422 – 425 act to respectively enable the storage units 432 – 435 to store error signals only during occurrence of the test voltage luminance level in the appropriate ranges for each unit. It will become appreciated that the number of storage units and the gradation of the categories are matters of convenient choice and need not correspond to any particular form of test signal. The use of at least three gradations and three storage units is recommended, however.

During each stairstep test signal, the capacitors 431 – 435 are selectively coupled to the error voltage which reflects presently measured amounts of differential phase distortion. Since this type of distortion does not vary significantly from field to field, the capacitors will normally maintain about the same voltage between successive frames. Any drifts in differential phase distortion, however, will be sensed by the capacitors which will change their stored voltages, thus storing updated voltages as required.

The error reading means 50 includes five field effect transistors 501 – 505. The gate electrodes of these transistors receive inverted versions of the outputs $C_0 - C_{80}$, the inversions being achieved by the gates 511 – 515. By inverting the outputs on the lines 20a, a single positive signal on the gate electrode of one of the transistors 501 – 505 is used to turn that gate on. The source electrodes of the transistors 501 – 505 are respectively coupled to the five capacitive storage units 431 – 435, the coupling being achieved via five operational amplifiers designated 521 – 525. The drain electrodes of the transistors 501 – 505 are coupled to a common output line 50a.

The reading means 50 operates throughout picture video to select the appropriate stored error value and continuously read it out over the line 50a. For example, if at some instant, the luminance level of the picture video is between 40 and 60 IRE units, only $C_{40}$ will be at "0" and the gate electrode of transistor 503 will go "high," turning on transistor 503. As a result, the voltage stored in capacitive storage unit 433 will appear on output line 50a. Remembering that this stored voltage is a measure of the error signal that was stored while the stairstep signal had been in this same luminance level range, it is seen that this voltage is a suitable measure of the present differential phase distortion at the present picture video luminance level. During the picture video, different ones of the FETs 501 – 505 will control the readout of the voltages stored in the capacitors 431 – 435, depending on the changing luminance level of the picture video. The operational amplifiers 521 – 525 have a high input impedance so that the voltages can be non-destructively read from the capacitors 431 – 435.

The selected error signal, read out on line 50a, is coupled to the control terminal of correction means 60 which also receives the input video. In the present embodiment, the correction means comprises a voltage-variable delay line which may be implemented using a varicap diode 601 and an inductor 602. The varicap diode operates, in well known manner, as a voltage-variable capacitor which, in conjunction with the inductor 602, introduces a phase shift into input video. The amount of phase shift depends upon the error voltage on line 50*a*. Using appropriate peripheral components, the correction means 60 is adjusted to introduce phase shifts which are equal and opposite to the ones reflected by the error signals on line 50*a*. The output of means 60 is thereby automatically corrected for differential phase distortion.

Figure 5:
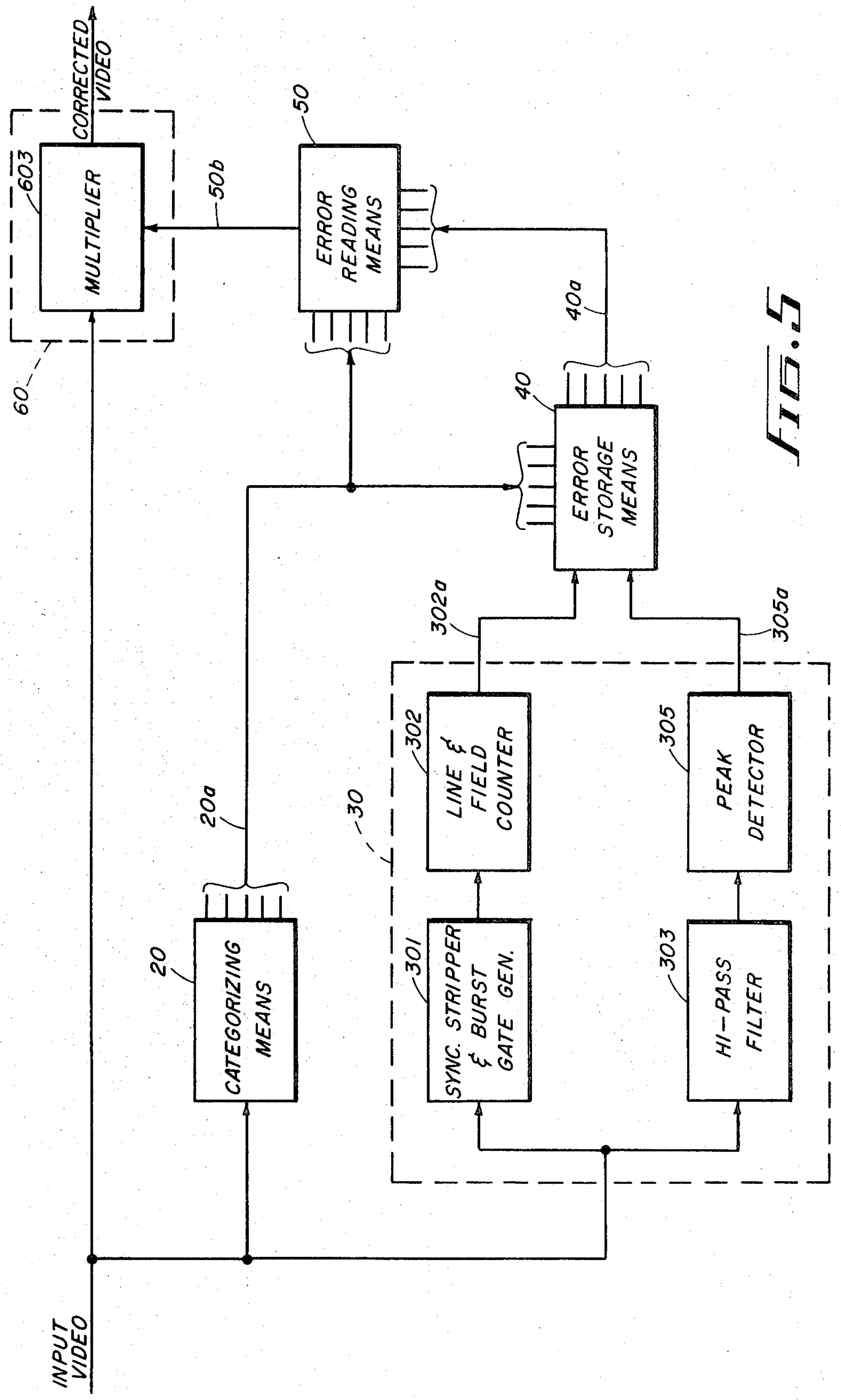
FIG. 5 is a block diagram of an embodiment of the invention that is utilized for the correction of differential gain distortions.

Referring to FIG. 5, there is shown a block diagram of an embodiment of the invention that is utilized for the correction of differential gain distortions. The categorizing means 20, error storage means 40, and error reading means 50 may be of the same form as described with respect to FIG. 3. In this embodiment, however, the error extracting means 30 takes on a somewhat different form in that a different type of error is being extracted from the test signals. Once again, a sync stripper and burst gate generator 301 and a line and field counter 302 are utilized to generate an enable signal 302*a* in the above-described manner. A high pass filter 303 again removes the low frequency steps from the stairstep test signal. In this case, a peak detector 305 is used to generate a voltage that depends on the amplitude of the oscillations that had been superimposed on the steps of the stairstep test signal. The derived error voltage is read out over a line 305*a* and stored in the error storage means 40 under control of the categorization signals as described above. During picture video, the appropriate stored error signal is read out of the error storage means over line 50*a*, again in the above-described manner. In the present embodiment, the correction means 60 is utilized to correct gain rather than phase. Therefore, the correction circuit 60 includes an analog multiplier 603 which multiplies the received input video by the error function and thereby introduces desired positive or negative gain to achieve corrected video.

Figure 6:
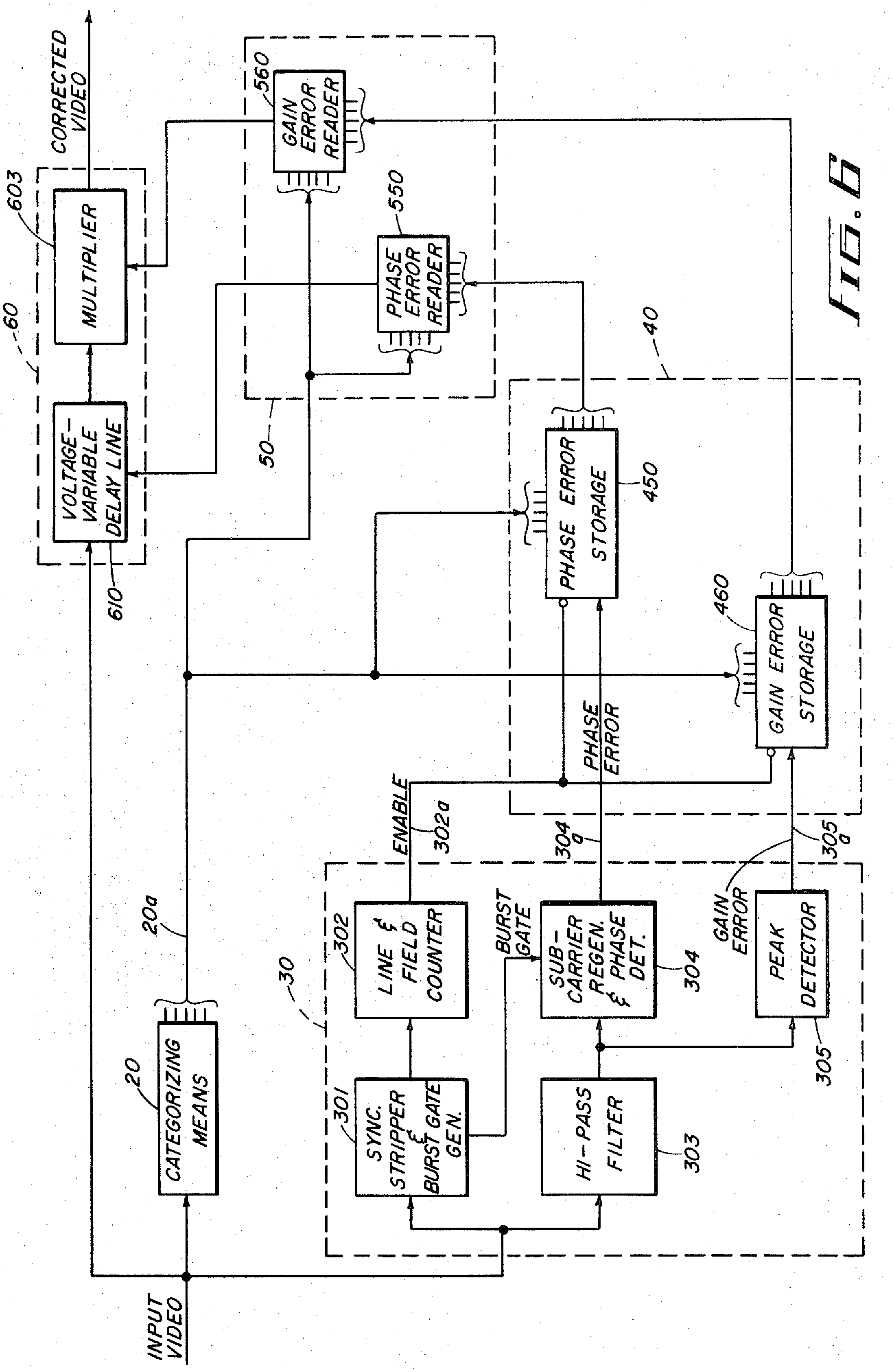
FIG. 6 is a block diagram of an embodiment of the invention that is utilized for the correction of both differential phase and differential gain distortions.

Referring to FIG. 6, there is shown a block diagram of an embodiment of the invention that is utilized for the correction of both differential phase and differential gain distortions. The circuit of FIG. 6 is, in principle, a combination of the circuits of FIGS. 3 and 5 except that certain common elements of these systems can be "shared." One such shared portion is the categorizing means 20. The error extracting means 30 of this embodiment includes both a phase detector 304 and a peak detector 305. The error signals on line 304*a* and 305*a* are respectively coupled to a phase error storage means 450 and a gain error storage means 460 which comprise the overall error storage means 40. The circuits 450 and 460 are of the type shown in FIG. 3, each having a plurality of storage units and selectively controlled transistors. While two separate storage circuits are necessary to store the two different types of errors, a single enable gate 410 (FIG. 3) may be shared between the two circuits since each receives the same categorization signals. During picture video, the gain and phase errors are selectively read out by separate error reading means 550 and gain error reading means 560 which comprise the error reading means 50. The errors read out are coupled over lines 50*a* and 50*b* to a correction circuit 60 which includes a multiplier 603 to achieve gain correction and a voltage variable delay line 610 to achieve phase correction. These units were described above in conjunction with FIGS. 3 and 5.

It should be pointed out that since the stored errors represent discrete averages of errors stored over continuous ranges, the amount of correction is an approximation for any particular luminance level. The approximation improves as the number of categories (storage units) increases, so the number of storage units should be kept to a reasonable minimum.

Figure 7:
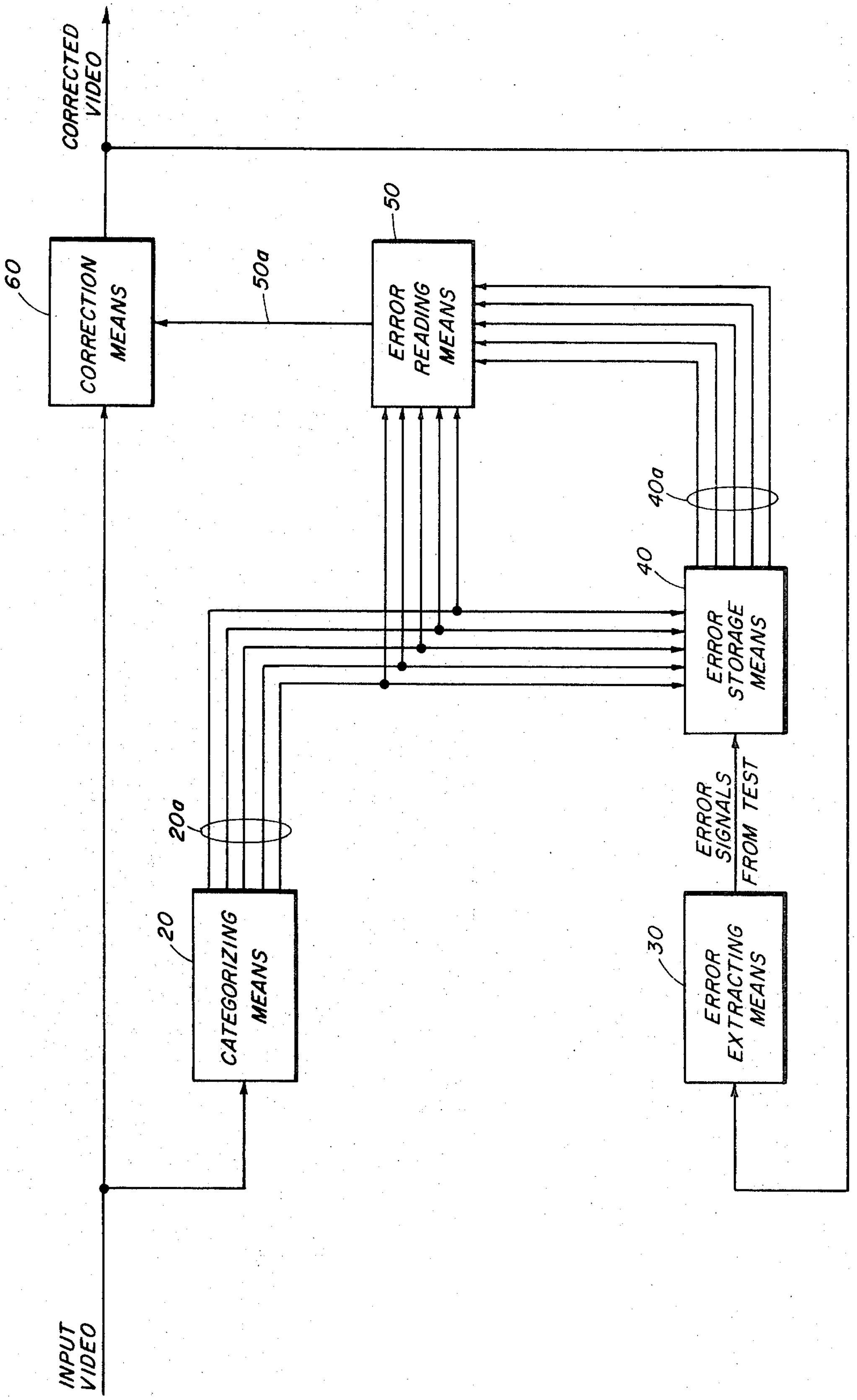

The foregoing embodiments have been illustrated as "open-loop" configurations in the sense that corrections associated with correction means 60 are somewhat dependent upon fixed parameters of the system. For example, in FIG. 2, if the gain associated with correction means 60 were to drift (due to, say, varying component temperatures), adjustment would be required to maintain previous levels of accuracy since a constant test signal error level would now lead to a different correction factor. This problem is overcome by the system of FIG. 7 wherein the error extraction from the test signals is "closed-loop" so that the correction level is virtually gain-independent. In this system, which has the same component blocks as FIG. 2, the input to the error extracting means 30 is taken from the output of the correction means 60 in closed-loop fashion. As a result, the stored error values are self-adjusted by feedback. Operation of the system during picture video is substantially the same as described with respect to FIG. 2.

I claim:

1. Apparatus for receiving input video that includes picture video and test signals which contain video distortion errors dependent on at least one varying property of the input video and occur periodically between segments of picture video, and automatically generating corrected picture video, the degree of correction depending on errors extracted from said test signals, comprising:

a. means responsive to said input video for categorizing the status of the input video and producing categorization signals indicative of the determined status;

b. means for extracting distortion errors from said test signals and generating error signals as a function of said distortion errors;

c. error storage means including a plurality of storage units which selectively store said error signals under control of said categorization signals;

d. error reading means for selectively reading out the contents of said storage units under control of said categorization signals; and e. correction means for modulating said input video in accordance with the output of said reading means.

2. Apparatus as defined by claim 1 wherein said extracting means receives as an input the output of said correction means.

3. Apparatus as defined by claim 1 wherein the varying property of the input video upon which distortion errors depend is luminance level, and wherein said categorization means produces categorization signals indicative of the instantaneous luminance level of the input video.

4. Apparatus as defined by claim 3 wherein said extracting means includes means for sensing the presence of test signals and generating an enable signal during said test signals.

5. Apparatus as defined by claim 4 wherein said storage units are enable to store error signals only during the presence of said enable signal.

6. Apparatus as defined by claim 3 wherein said error extracting means extracts differential gain distortion errors from said test signals.

7. Apparatus as defined by claim 6 wherein said error reading means includes a plurality of control devices, each device having first, second, and control terminals, said first terminals being respectively coupled to different ones of said storage units, all of said second terminals being coupled to a common output line that is coupled to said correction means, and said control terminals respectively receiving said categorization signals.

8. Apparatus as defined by claim 3 wherein said error extracting means extracts differential phase distortion errors from said test signals.

9. Apparatus as defined by claim 8 wherein said error storage means includes a plurality of control devices, each device having first, second, and control terminals, all of said first terminals receiving said error signals in common, said second terminals being respectively coupled to different ones of said storage units, and said control terminals respectively receiving said categorization signals.

10. Apparatus as defined by claim 8 wherein said error reading means includes a plurality of control devices, each device having first, second, and control terminals, said first terminals being respectively coupled to different ones of said storage units, all of said second terminals being coupled to a common output line that is coupled to said correction means, and said control terminals respectively receiving said categorization signals.

11. Apparatus as defined by claim 10 wherein said error storage means includes a plurality of control devices, each device having first, second, and control terminals, all of said first terminals receiving said error signals in common, said second terminals being respectively coupled to different ones of said storage units and said control terminals respectively receiving said categorization signals.

12. Apparatus for receiving input video that includes picture video and test signals which contain video distortion errors dependent on the luminance level of the input video and occur periodically between segments of picture video, and automatically generating corrected picture video, the degree of correction depending on errors extracted from said test signals, comprising:

a. means responsive to said input video for categorizing the luminance level of the input video and producing categorization signals indicative of the determined level;
b. means responsive to said input video for extracting differential gain errors and differential phase errors from said test signals and for generating gain error signals and phase error signals as a function of said distortion errors;
c. gain error storage means including a plurality of gain error storage units which selectively store said gain error signals under control of said categorization signals;
d. phase error storage means including a plurality of phase error storage units which selectively store said phase error signals under control of said categorization signals;
e. gain error reading means for selectively reading out the contents of said gain error storage units under control of said categorization signals;
f. phase error reading means for selectively reading out the contents of said phase error storage units under control of said categorization signals; and
g. correction means for modulating said input video in accordance with the output of said gain error reading means and said phase error reading means.

13. Apparatus as defined by claim 12 wherein said extracting means includes means for sensing the presence of test signals and generating an enable signal during said test signals.

14. Apparatus as defined by claim 13 wherein said gain error storage units and said phase error storage units are enabled to store error signals only during the presence of said enable signal.

15. Apparatus as defined by claim 14 wherein said gain error storage means includes a plurality of control devices, each device having first, second, and control terminals, all of said first terminals receiving said gain error signals in common, said second terminals being respectively coupled to different ones of said gain error storage units, and said control terminals respectively receiving said categorization signals.

16. Apparatus as defined by claim 15 wherein said phase error storage means includes a plurality of control devices, each device having first, second, and control terminals, all of said first terminals receiving said phase error signals in common, said second terminals being respectively coupled to different ones of said phase error storage units, and said control terminals respectively receiving said categorization signals.

17. Apparatus as defined by claim 16 wherein said gain error reading means includes a plurality of control devices, each device having first, second, and control terminals, said first terminals being respectively coupled to different ones of said gain error storage units, all of said second terminals being coupled to a common output line that is coupled to said correction means, and said control terminals respectively receiving said categorization signals.

18. Apparatus as defined by claim 17 wherein said phase error reading means includes a plurality of control devices, each having first, second, and control terminals, said first terminals being respectively coupled to different ones of said phase error storage units, all of said second terminals being coupled to a common output line that is coupled to said correction means, and said control terminals respectively receiving said categorization signals.

19. Apparatus as defined by claim 18 wherein said correction means includes an analog multiplier which receives signals read out of said gain error storage means, and a voltage-variable delay line which receives signals read out of said phase error storage means.

20. A method of automatically generating corrected picture video from received input video that includes picture video and test signals which contain video distortion errors dependent on at least one varying property of the input video and occur periodically between segments of picture video, comprising the steps of:

a. categorizing the status of the input video and producing categorization signals indicative of the determined status;

b. extracting distortion errors from the test signals and generating error signals as a function of the distortion errors;

c. selectively storing the error signals under control of the categorization signals;

d. reading out the stored error signals under control of the categorization signals; and e. modulating the input video in accordance with the read-out error signals.

21. The method as defined by claim 20 wherein the step of producing categorization signals is performed by sensing the luminance level of the input video.

* * * * *